United States Patent [19]

Morel et al.

[11] 3,789,817
[45] Feb. 5, 1974

[54] ANTI-POLLUTION SUPPLY DEVICE FOR INTERNAL COMBUSTION ENGINES

[76] Inventors: Marcel Morel, 14 Mesnil Clinchamps; Lucien Lepareur, 49, Avenue de la Gare, Vire, both of France

[22] Filed: Apr. 28, 1972

[21] Appl. No.: 248,645

[30] Foreign Application Priority Data
Apr. 30, 1971 France .............................. 71.15575

[52] U.S. Cl. ............ 123/133, 123/34 A, 123/122 E, 123/122 F, 123/122 H, 123/179 G, 123/180 EH
[51] Int. Cl.. F02m 1/08, F02m 31/12, F02m 31/14
[58] Field of Search... 123/179 G, 180 E, 180 EH, 123/122 E, 122 F, 122 H, 133, 34, 34A, 35

[56] References Cited
UNITED STATES PATENTS

| | | | |
|---|---|---|---|
| 3,072,113 | 1/1963 | Champ | 123/133 |
| 1,319,718 | 10/1919 | Martin | 123/122 F |
| 1,085,425 | 1/1914 | Hobe & Traub | 123/133 |
| 1,160,897 | 11/1915 | Holloway | 123/122 E |

FOREIGN PATENTS OR APPLICATIONS
504,212  7/1954  Canada .......................... 123/122 E

*Primary Examiner*—Al Lawrence Smith
*Assistant Examiner*—W. H. Rutledge, Jr.
*Attorney, Agent, or Firm*—Holman & Stern

[57] ABSTRACT

Anti-pollution supply device for an internal combustion engine which comprises an air intake pipe, a main fuel supply pipe and an auxiliary fuel supply pipe. The main fuel pipe has a portion in the form of a frusto-conical spiral disposed in a vaporization chamber heated by the exhaust gases of the engine. A thermostat is responsive to the temperature in the vaporization chamber and controls the supply of fuel above a given temperature in said chamber. The auxiliary fuel supply pipe is surrounded at least partly by an electric heating resistance and an auxiliary air intake pipe communicates with said air intake pipe. Control means are provided for heating the resistance and allowing supply of auxiliary air and auxiliary fuel for starting the engine above a predetermined temperature in the heating resistance and so long as the given temperature of the vaporization chamber has not been reached.

7 Claims, 2 Drawing Figures

ANTI-POLLUTION SUPPLY DEVICE FOR INTERNAL COMBUSTION ENGINES

The present invention relates to a supply device for internal combustion engines and more particularly engines of the explosion type which eliminates the main causes of pollution by the exhaust gases owing to a complete vaporization of the fuel in respect of the starting, normal operation and idling of the engine.

It is indeed well known that in conventional explosion engines having a carburetter, the briefness of the time between the moment of ignition and the end of the explosion (1/240 of a second for an engine running at 7,200 rpm) allows only a part of the gaseous fuel-air mixture to explode. The other part is burnt partially when the exhaust valve is already raised and is therefore expelled into the exhaust pipe. Consequently, it produces no work and the energy produced is lost. On the other hand, it produces multiple combinations of pollutants. The amount of pollutants produced is in fact even higher, since, as a consequence of this partial combustion, if good engine performance is to be obtained more fuel has to be employed than the amount theoretically required.

An object of the present invention is to remedy these drawbacks and to provide a supply device whereby it is possible to eliminate these pollutants by achieving a complete vaporization irrespective of the running speed of the engine.

The invention provides a supply device which comprises an air intake pipe, a main fuel supply pipe wound in a frustoconical spiral in a vaporization chamber heated by the exhaust gases of the engine and connected to a valve controlling the supply of the liquid fuel and to two fuel introducing pipes for introducing the vaporized fuel in the air intake pipe; a thermostat which is responsive to the temperature in the vaporization chamber and controls the opening of the valve of the main fuel supply pipe above a given temperature in said chamber; an auxiliary fuel supply pipe surrounded at least partly by an electric heating resistance and connected to a valve controlling the supply of the liquid fuel and to a pipe for introducing vaporized fuel in the air intake pipe; and control means for controlling the heating of the resistance, the opening of the auxiliary fuel supply valve and the starting of the engine.

As the two fuel supply systems ensure the prior heating of the fuel, the latter is always vaporized before it is introduced in the air intake pipe. Its combustion is therefore complete no matter which fuel supply system is in operation. However, the thermostat in the vaporization chamber always prevents the supply of fuel to this chamber so long as the exhaust gases of the engine are not hot enough to vaporize this fuel and thus precludes flooding the engine. Before this temperature is reached, for example when starting the engine, the fuel is supplied by way of the auxiliary fuel pipe and the heating resistance of the auxiliary device ensures the vaporization of the fuel.

The heating of the electrical resistance is controlled by the engine starter switch. The valve of the auxiliary fuel supply circuit, or engine starting circuit, may be opened at the same time as the heating resistance is supplied with current or automatically as a function of the temperature of this resistance.

In some cases it may be advantageous to employ a completely automatic control. The thermostat of the vaporization chamber is then connected to the circuit of the heating resistance and to the energizing circuit of the electromagnet controlling the main fuel supply valve so that the heating of the resistance ceases as soon as the fuel supply valve is opened and vice versa and there is always at least one fuel supply pipe in use, namely the main pipe or the auxiliary pipe, depending on the temperature of the exhaust gases.

Further features and advantages of the invention will be apparent from the ensuing description with reference to the accompanying drawings.

Figure 1:
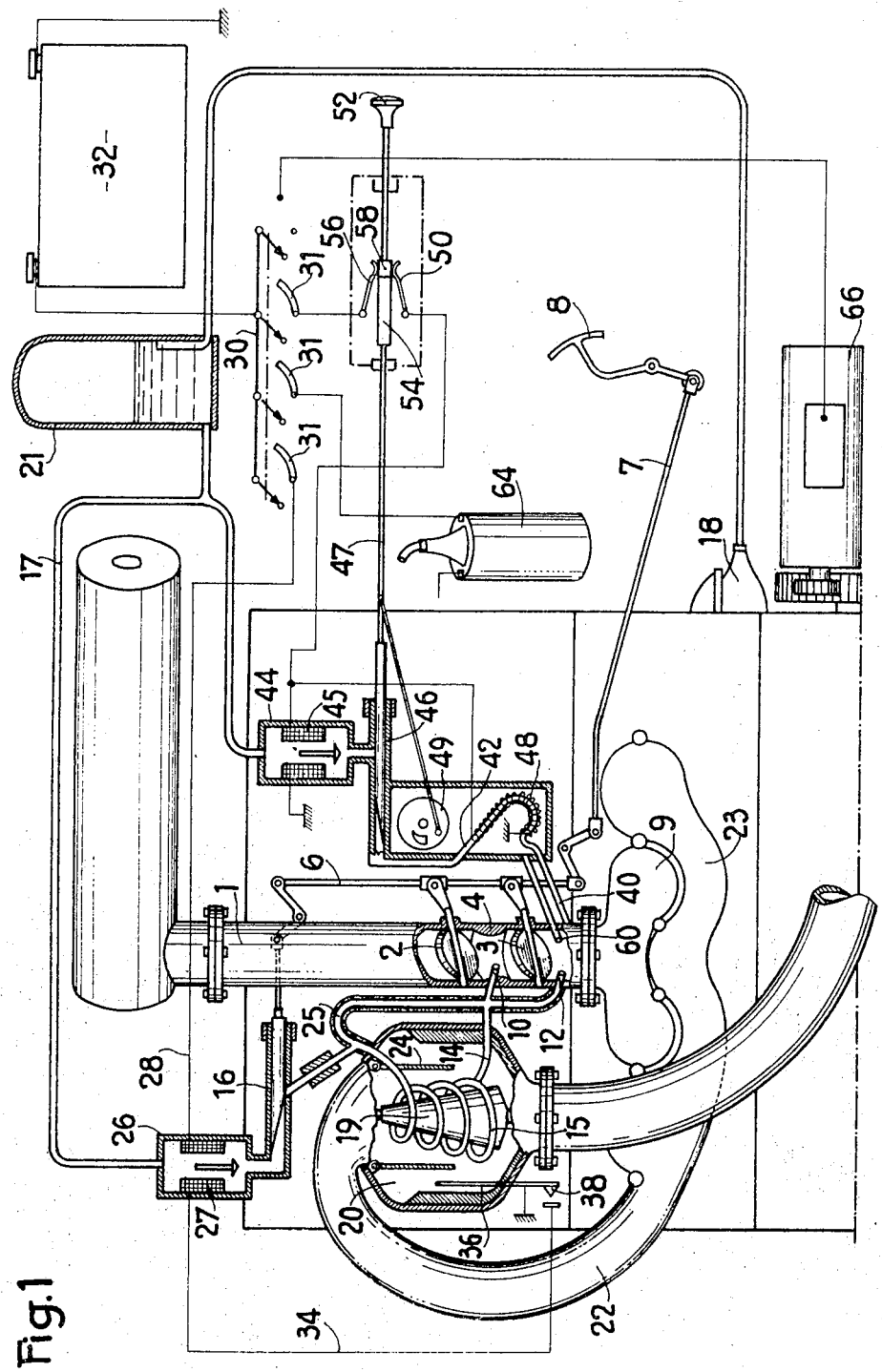
FIG. 1 is a diagrammatic view of a semi-automatic fuel supply device.

The fuel supply device shown in the drawings comprises essentially an air intake pipe 1 for supplying air to the engine. This pipe is provided in the conventional manner with two butterfly valves or throttles 2 and 3 for regulating the supply of air and has between these throttles a venturi portion 4. The throttles 2 and 3 are connected to a common control rod 6 which is shifted by a linkage system 7 connected to the accelerator pedal 8. The pipe 1 communicates with an induction manifold 9.

In the pipe 1 there opens on each side of the lower throttle 3 two outlet pipes 10 and 12 which are connected through a pipe 14, a flow variator 16 and a pipe 17, to a fuel supply pump 18. If desired, a flow regulator 21 is inserted between the variator 16 and the pump 18. The outlet pipe 10 is located between the two throttles in the venturi portion 4 and performs the function of a normal engine operation jet whereas the pipe 12 communicates with the pipe 1 below the throttle 3 and performs the function of an idling speed jet. The flow variator 16 is controlled, in the same way as the throttles 2 and 3, by the accelerator pedal 8.

Between the flow variator 16 and the pipes 10 and 12, the pipe 14 is wound in the form of a frustoconical spiral 15 around a cone 19 mounted at the centre of a vaporization chamber 20. This vaporization chamber is partly defined by an enlarged part of the wall of an exhaust pipe 22 for the gases of combustion which leave the engine by way of the exhaust manifold 23. This enlarged part of pipe 22 has a radiating layer. In the chamber 20, the centre cone 19 is preferably of a material which is a very good conductor of heat, for example copper, so as to radiate heat and the exhaust gases flow downwardly. Vertical radiating plates 24, for example four plates, are suspended from the upper part of the wall of the chamber 20 and arranged around the cone 19 and the spiral 15 to guide the gases flowing in the chamber 20 toward the spiral and cone. These plates are supported only in their upper part and normally assume, in the absence of flow and under the effect of their weight, a vertical position parallel to the axis of the cone. However, they move apart under the action of the pressure of the exhaust gases but always tend to urge said gases in contact with the spiral 15 and cone 19. A branchpipe 25 outside the chamber 20 interconnects the two ends of the spiral 15.

The fuel delivered by the pump 18 passes through the flow regulation reservoir 21 and enters the flow variator 16 and the pipe 14 by way of an electrically operated valve 26 which is preferably an electromagnetically operated valve maintained closed in the absence of energization of its electromagnet 27 but opens when this electromagnet is energized. A conductor 28 connects the electromagnet to a switch 30 connected to a battery 32. The electromagnet 27 is connected moreover by a conductor 34 to a thermostat 36 placed in the vaporization chamber 20 and grounded. This thermostat controls a switch 38 which cuts off the energization circuit of the electromagnet 27 so long as the temperature of the vaporization chamber 20 has not reached a predetermined value. When this value is reached, the thermostat 36 closes the switch 38, and consequently the energization circuit of the electromagnet 27, and thus opens the valve 26 which permits the supply of fuel to the spiral 15 and consequently to the outlet pipes 10 and 12. The fuel is vaporized when it passes through the chamber 20 by contact with the hot gases which traverse this chamber and by the proximity of the cone 19 so that the pipe 10, or even the idling pipe 12, introduces in the pipe 1 a gaseous fuel which may be easily mixed with air and subsequently completely burnt.

In addition to this main fuel supply system, the device also comprises an auxiliary fuel supply outlet pipe 40 which communicates with the pipe 1 below the butterfly throttle 3. This outlet pipe is fixed to the end of a pipe 42 which is connected by way of an electrically operated valve 44 to the fuel supply circuit, that is, to the flow regulator 21 and the pump 18. A flow variator 46 is moreover inserted in the pipe 42 at the outlet of the valve 44. It is controlled by a rod 47 which is connected to a cold starting pull-knob 52 and controls an air flow regulator 49.

The pipe 42 is surrounded by an electrical heating resistance 48 which is grounded and electrically connected to an electromagnet 45 controlling the valve 44 which is itself grounded, and to a contact 50. The latter bears on a plug 54 which is integral with the rod 47 and has an electrically insulating portion 58. The plug 54 puts the contact 50 in connection with another contact 56 connected to one of the terminals of the switch 30. In this way, when the rod 52 is in the inoperative position of rest, the contacts 50 and 56 are separated by the insulating portion 58 and the heating resistance is not energized. On the other hand, when the choke is pulled out and the switch 30 is in the position for operation of the engine, the contact 50 is electrically connected to the contact 56. The resistance 48 heats and the electromagnet 45 opens the valve 44. The fuel enters the pipe 40 and the pipe 1.

However, the heating of the resistance 48 vaporizes the fuel before it enters the pipe 1. An auxiliary air intake pipe 60 is moreover provided below the throttle 3 for supplying air in the vicinity of the pipe 40 while the throttles are still closed and no force is exerted on the accelerator pedal 8.

When the engine is started, it is thus possible, after having actuated the switch 30 to energize the ignition coil 64 and supply power to the terminals 31 connected to the contact 56 and to the electromagnet 27, and by pulling on the cold starting pull-rod 52, to open the valve 44 and to cause the heating of the resistance 48, that is to say to supply the air intake pipe 1 with heated and vaporized fuel ready to be completely burnt in the engine. A further travel of the switch 30 then operates the starter 66. The conductor 28 and consequently the electromagnet 27 is connected to the battery 32 but as the switch 38 is open the electromagnet cannot be energized. It is only after a certain period of operation when the exhaust gases are sufficiently hot that the thermostat 37 closes the switch 38 and causes the opening of the valve 26 and thereafter the supply of fuel to the engine by way of the main fuel pipe 14 and the normal engine operation outlet pipe 10. The pull-rod 52 is then depressed so as to cut off the electric supply to the resistance 48 and to the valve 44.

The engine is started in an extremely sure manner. At no moment is there a risk of flooding the engine, since the fuel can only enter the main fuel pipe when the engine is hot enough to permit the vaporization of the fuel.

Figure 2:
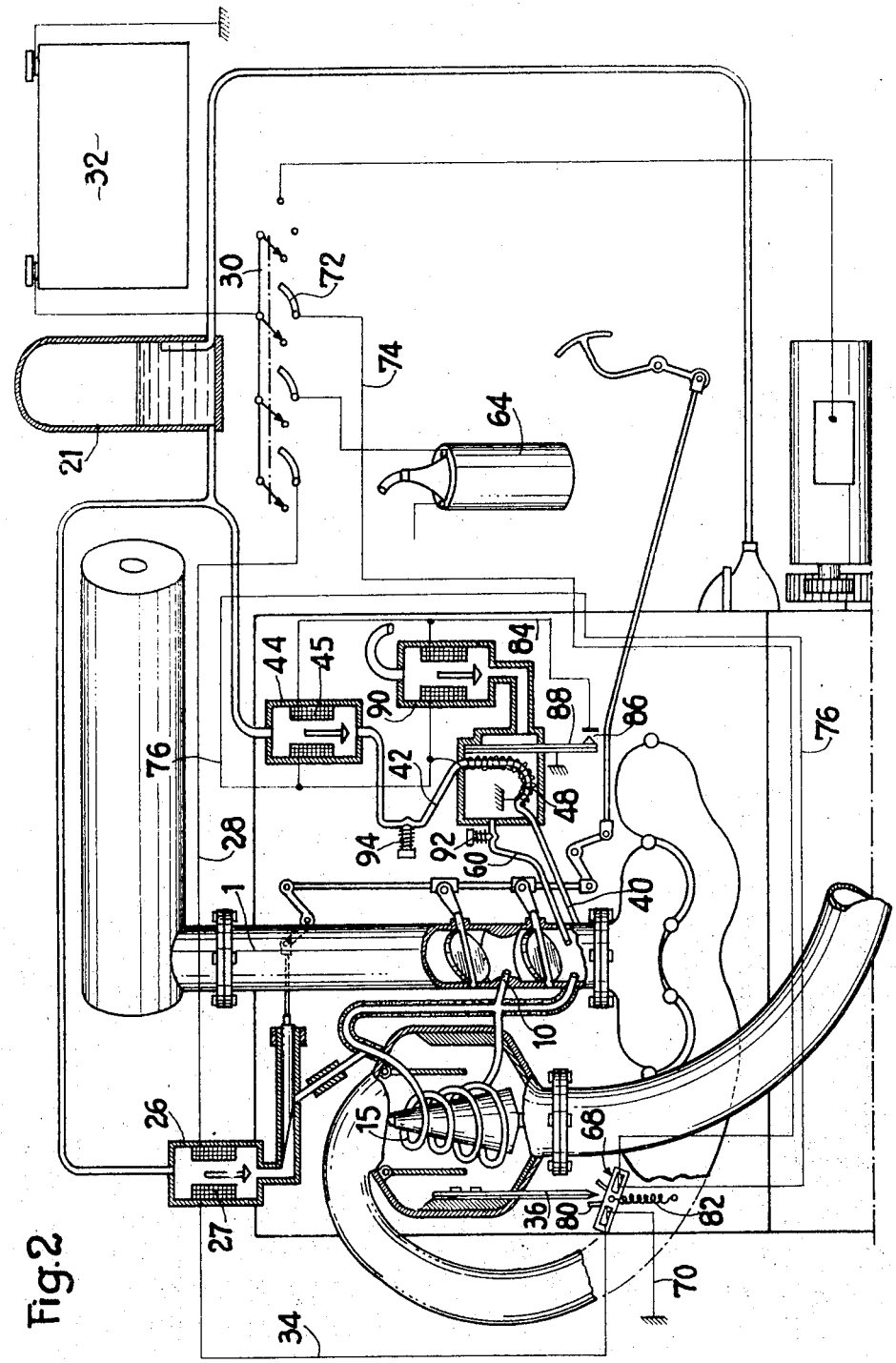
FIG. 2 is a diagrammatic view of the same supply device but provided with an automatic control.

In some cases it may be advantageous to provide a completely automatic control, such as that shown in FIG. 2. The electromagnet 27 is, as before, connected by a conductor 28 to one of the terminals of the switch 30. However, it is connected by the conductor 34 to a tumbler switch, such as that shown at 68, which comprises two mercury containers of which one is grounded at 70 and connected to the conductor 34 and the other is connected to one of the terminals 72 of the switch 30 through a conductor 74 and to the resistance 48 through a conductor 76. The thermostat 36 controls the switch 68 in coming alternately in contact with either of two plates 80 fixed to the support of the mercury containers, a spring 82 maintaining the containers in their position, and possibly holding them stationary in a single stable position which corresponds to the simultaneous closure of the two circuits.

In this embodiment, the electromagnet 45 of the valve 44 is connected to the conductor 76 and electrically connected, through a conductor 84 and a switch 86, to a thermostat 88 which is responsive to the temperature of the heating resistance 48. This thermostat 88 closes the switch 86 and consequently energizes the electromagnet 45 when the temperature of the resistance has reached a predetermined value. A second electrically operated valve 90 controlling the supply of air to the auxiliary pipe 60 may be connected between the conductors 84 and 76 and also controlled by the thermostat 88 and the switch 86.

A flow-regulating needle valve 92 is advantageously inserted in the pipe 60 and a second needle valve 94 is inserted in the pipe 42 upstream of the heating resistance 48. The cold starting means 52 is then eliminated and the switch 30 controls the whole of the fuel supply device.

When starting the engine, this switch 30 therefore, in a first position, supplies current to the ignition coil 64 and then to the heating resistance 48 through the corresponding mercury container of the switch 68. When the resistance has sufficient temperature, the thermostat 88 closes the switch 86 and causes the energization of the electromagnets of the valves 44 and 90. These valves are opened and the air and the vaporized fuel are supplied to the pipe 1. The switch then starts the engine and consequently causes the heating of the vaporization chamber 20 by the exhaust gases.

As soon as the temperature in this vaporization chamber 20 has reached the predetermined value for which the thermostat 36 is regulated, the latter causes the switch 68 to swing first to an intermediate position in which both the electrical circuits are energized. During an instant, the auxiliary fuel supply valve 44 remains open whereas the main fuel supply valve 26 is also open. The fuel then flows through the pipe 14, is vaporized in the chamber 20 and enters the pipe 1. The engine then runs first at idling speed and then normally. The temperature rises in the vaporization chamber 20 and this causes an additional swinging of the thermostat 36 and consequently the closure of the supply circuit of the resistance 48 and of the valves 44 and 90. Normal engine running speeds has been reached.

In both embodiments, the vaporization chamber and the main fuel supply pipe are preferably provided with outer heat-insulating protection against a possible cooling by the exterior air.

It will be observed that the fuel supply device according to the invention permits engine operation with various fuels and however improves the efficiency at present obtained. Fuel consumption is therefore reduced. Thus, with appropriate fuel and comburent, a well-calculated compression ratio, a judiciously metered gaseous mixture and, a precise ignition time, there is provided a solution to the present problem of the utilization of the internal combustion engine and the most severe standards in the fight against pollution of the air are satisfied. The noise of the engine is also decreased.

Indeed, as the combustion is complete, the major part of the pollutants, such as carbon monoxides, hydrocarbons, certain nitrogen oxides, and various others are eliminated at all running speeds of the engine. Further, a compression ratio higher than that actually possible with carburetter engines may be reached. Starting is moreover facilitated by the initial heating of the fuel and by the presence of a reserve of fuel under pressure in the reservoir 21 which is located in the upper part of the device. There is no danger of flooding the engine when starting under difficult conditions.

It must be understood that various modifications may be made to the embodiments just described without departing from the scope of the invention. In particular, signal lamps of variable colour could be employed for indicating at each instant the position of the various component parts, for example for indicating that the heating resistance circuit is supplied with power or that the auxiliary fuel supply valve is open. Other signals or lights showing the position of the switch of the thermostat of the vaporization chamber and/or indicating the energization of the coil or that of the starter could also be employed. They are of particular interest with the semi-automatic device shown in FIG. 1 but also facilitate the use of the automatic device.

Having now described our invention what We claim as new and desire to secure by Letters Patent is :

1. An anti-pollution supply device for an internal combustion engine, comprising an air intake pipe, a main fuel supply pipe, an auxiliary fuel supply pipe, a vaporization chamber for communication with the interior of exhaust pipe of the engine, the main fuel supply pipe having a portion of pipe having a coil configuration and disposed in the vaporization chamber so as to be exposed to and heated by the exhaust gases of the engine, two first vaporized fuel introducing pipes communicating with the interior of the air intake pipe and connected to the main fuel supply pipe, a first valve in the main fuel supply pipe for controlling the supply of the fuel, a thermostat responsive to the temperature of the interior of the vaporization chamber and associated with the valve to close the valve when the temperature in the vaporization chamber is below a predetermined value and open the valve when said temperature is above said predetermined value, an electrical heating resistance surrounding a portion of the auxiliary fuel supply pipe, a second vaporized fuel introducing pipe connected to the auxiliary supply pipe downstream of the heating resistance and communicating with the interior of the air intake pipe, a second valve in the auxiliary supply pipe for controlling the supply of fuel in the auxiliary supply pipe, means for opening the second valve and supplying electrical power to the heating resistance when starting the engine so long as the temperature in the vaporization chamber is below said predetermined value, and separate swingable plates for regulating the passage of the exhaust gases, each plate depending freely from the upper part of the vaporization chamber around the coil of the main fuel supply pipe, said coil having a frustoconical spiral form.

2. An anti-pollution supply device as claimed in claim 1, wherein the second valve is electrically operated and the means for opening the second valve are electrical means.

3. A device as claimed in claim 1, comprising first fuel flow variating means in the main supply pipe between the first valve and the vaporization chamber, fuel flow variating means in the auxiliary fuel supply pipe between the second valve and the heating resistance and a fuel flow regulator upstream of said valves.

4. A device as claimed in claim 1, comprising a fuel pump having an outlet connected to the main supply pipe and to the auxiliary supply pipe.

5. An anti-pollution supply device for an internal combustion engine, comprising an air intake pipe, a main fuel supply pipe, an auxiliary fuel supply pipe, a vaporization chamber for communication with the interior of exhaust pipe of the engine, the main fuel supply pipe having a portion of pipe having a coil configuration and disposed in the vaporization chamber so as to be exposed to and heated by the exhaust gases of the engine, two first vaporized fuel introducing pipes communicating with the interior of the air intake pipe and connected to the main fuel supply pipe, a first valve in the main fuel supply pipe for controlling the supply of the fuel, a thermostat responsive to the temperature of the interior of the vaporization chamber and associated with the valve to close the valve when the temperature in the vaporization chamber is below a predetermined value and open the valve when said temperature is above said predetermined value, an electrical heating resistance surrounding a portion of the auxiliary fuel supply pipe, a second vaporized fuel introducing pipe connected to the auxiliary supply pipe downstream of the heating resistance and communicating with the interior of the air intake pipe, a second valve in the auxiliary supply pipe for controlling the supply of fuel in the auxiliary supply pipe, means for opening the second valve and supplying electrical power to the heating resistance when starting the engine so long as the temperature in the vaporization chamber is below said predetermined value, and a second thermostat responsive to the temperature of the heating resistance and associated with the second valve so as to open the second valve above a predetermined temperature of the resistance.

6. A device as claimed in claim 5, comprising an auxiliary air intake pipe communicating with the interior of said air intake pipe and a third valve in the auxiliary air intake pipe for controlling the supply of air, the second thermostat being associated with the third valve so as to open the third valve above said predetermined temperature of the resistance.

7. An anti-pollution supply device for an internal combustion engine, comprising an air intake pipe, an auxiliary fuel supply pipe, a vaporization chamber for communication with the interior of exhaust pipe of the engine, the main fuel supply pipe having a portion of pipe having a coil configuration and disposed in the vaporization chamber so as to be exposed to and heated by the exhaust gases of the engine, two first vaporized fuel introducing pipes communicating with the interior of the air intake pipe and connected to the main fuel supply pipe, a first valve in the main fuel supply pipe for controlling the supply of the fuel, a thermostat responsive to the temperature of the interior of the vaporization chamber and associated with the valve to close the valve when the temperature in the vaporization chamber is below a predetermined value and open the valve when said temperature is above said predetermined value, an electrical heating resistance surrounding a portion of the auxiliary fuel supply pipe, a second vaporized fuel introducing pipe connected to the auxiliary supply pipe downstream of the heating resistance and communicating with the interior of the air intake pipe, a second valve in the auxiliary supply pipe for controlling the supply of fuel in the auxiliary supply pipe, means for opening the second valve and supplying electrical power to the heating resistance when starting the engine so long as the temperature in the vaporization chamber is below said predetermined value, wherein the first valve is an electrically operated valve and an electrical circuit connects the first valve to a source of current, and the device further comprises a tumbler switch electrically associated with circuit of the first valve and with the heating resistance so as to allow supply of electrical power to the heating resistance in a first extreme position of the tumbler switch, then open the first valve and allow supply of power to the heating resistance in an intermediate position and then stop supply of electrical power to the heating resistance in a second extreme position, the thermostat being associated with the tumbler switch so as to cause the tumbler switch to move through said first, intermediate and second positions as the temperature in the vaporization chamber rises, said intermediate position being reached when said predetermined temperature in the vaporization chamber is reached.

* * * * *